US010187797B2

(12) United States Patent
Auger

(10) Patent No.: US 10,187,797 B2
(45) Date of Patent: *Jan. 22, 2019

(54) CODE-BASED AUTHORIZATION OF MOBILE DEVICE

(71) Applicant: D2L CORPORATION, Kitchener (CA)

(72) Inventor: Jeremy Auger, Kitchener (CA)

(73) Assignee: D2L Corporation, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,591

(22) Filed: Mar. 17, 2017

(65) Prior Publication Data

US 2017/0188237 A1 Jun. 29, 2017

Related U.S. Application Data

(63) Continuation of application No. 14/487,319, filed on Sep. 16, 2014, now Pat. No. 9,635,550, which is a
(Continued)

(51) Int. Cl.
*G06F 7/04* (2006.01)
*H04W 12/06* (2009.01)
(Continued)

(52) U.S. Cl.
CPC ............ *H04W 12/06* (2013.01); *G06F 21/36* (2013.01); *G06K 5/00* (2013.01); *G06K 7/1417* (2013.01);
(Continued)

(58) Field of Classification Search
None
See application file for complete search history.

(56) References Cited

U.S. PATENT DOCUMENTS

2009/0132813 A1* 5/2009 Schibuk ............... G06Q 20/223
713/158
2011/0035662 A1 2/2011 King et al.
2013/0262857 A1* 10/2013 Neuman ................ H04L 63/08
713/155

OTHER PUBLICATIONS

United States Patent and Trademark Office, Office Action on U.S. Appl. No. 13/570,855, dated Oct. 29, 2013.
(Continued)

*Primary Examiner* — Brandon S Hoffman
(74) *Attorney, Agent, or Firm* — Gowling WLG (Canada) LLP; Neil W. Henderson

(57) ABSTRACT

A system and method for authenticating mobile communications devices. The method comprises: generating a code corresponding to a user configured to be rendered on a rendering device to produce a rendered code, the rendered code being readable by a mobile communications device having a code reading device, the rendered code comprising a secret token; storing the secret token along with information identifying the user on a first storage device; providing the code to the user; receiving, at the authentication server, a setup message from the mobile device, the message includes a device identifier and the secret token; comparing the received secret token and the secret token stored on the first storage device; if the received secret token matches the secret token stored on the first storage device, storing, on a second storage device, information identifying the user and a trusted device value corresponding to the device identifier.

20 Claims, 3 Drawing Sheets

Related U.S. Application Data continuation of application No. 13/570,855, filed on Aug. 9, 2012, now Pat. No. 8,850,542.

(51) Int. Cl.
    *G06F 21/36*     (2013.01)
    *H04L 29/08*     (2006.01)
    *G06K 5/00*     (2006.01)
    *H04L 29/06*     (2006.01)
    *G06K 7/14*     (2006.01)

(52) U.S. Cl.
    CPC .......... *H04L 63/08* (2013.01); *H04L 63/0853* (2013.01); *H04L 67/02* (2013.01)

(56) References Cited

OTHER PUBLICATIONS

United States Patent and Trademark Office, Office Action on U.S. Appl. No. 14/487,319, dated Oct. 26, 2015.
United States Patent and Trademark Office, Final Office Action on U.S. Appl. No. 14/487,319, dated May 5, 2016.

\* cited by examiner

CODE-BASED AUTHORIZATION OF MOBILE DEVICE

RELATED APPLICATIONS

This application is a continuation of U.S. patent application Ser. No. 14/487,319, filed Sep. 16, 2014, which issued as U.S. Pat. No. 9,635,550, and which is itself a continuation of U.S. patent application Ser. No. 13/570,855, filed Aug. 9, 2012, which issued as U.S. Pat. No. 8,850,542, both of which are incorporated herein by reference in their entirety.

FIELD

The present disclosure relates generally to systems and methods for authenticating mobile communications devices. More particularly, the present disclosure relates to systems and methods for authenticating mobile communications devices for websites and web services.

BACKGROUND

When accessing secure websites and web services a user generally is prompted to enter a username and password. Users often access the same websites and web services on a variety of computing devices, such as for example, a personal computer or a mobile communication device, such as for example, a smart phone.

The above information is presented as background information only to assist with an understanding of the present disclosure. No determination has been made, and no assertion is made, as to whether any of the above might be applicable as prior art with regard to the present invention.

SUMMARY

In a first aspect, some embodiments disclosed herein relate to a method of authenticating mobile communications devices. The method comprises: generating a code corresponding to a user, the code configured to be rendered on a rendering device to produce a rendered code, the rendered code being readable by a mobile communications device having a code reading device, the rendered code comprising a secret token; storing the secret token along with information identifying the user on a first storage device associated with an authentication server; providing the code to the user; receiving, at the authentication server, at least one setup message from the mobile communications device, the at least one setup message comprising a device identifier and the secret token; comparing the received secret token and the secret token stored on the first storage device; and if the received secret token matches the secret token stored on the first storage device, storing, on a second storage device associated with the server, information identifying the user and a trusted device value corresponding to the device identifier.

In some embodiments, the first and second storage devices are the same storage device. In various embodiments, the first and second storage devices can be directly or indirectly coupled to the server.

In some embodiments, the setup message also comprises a user name. In some embodiments, the setup message also comprises a user password. In various embodiments, the user name and password are the user name and password used by the user to access the web service. For example, the username and password can be the user name and password used by the user to access the web service on a personal computer. In some embodiments, the method further comprises verifying the user name or the password or both prior to storing the traduced device value.

In some embodiments, the rendering device can be, for example but is not limited to, a display device or a printing device.

In some embodiments, the code comprises an identifier of a server for sending the setup message.

In various embodiments, the method further comprises: receiving, at the authentication server, information pertaining to a request by a requesting mobile communications device for access to a web service, the information comprising a requesting device identifier; determining whether the requesting device identifier corresponds to the trusted device value stored on the storage device; and denying access to the web service if the requesting device identifier does not correspond to the trusted device value.

In some embodiments, the authentication server comprises a web server hosting the web services.

In some embodiments, the web service is accessible to the user through a user ID and a password and the web service is further accessible to the mobile device through the requesting device identifier. In other words, in some embodiments, the device identifier is used in place of or instead of the user name and password to gain access to the web service through the mobile device.

In various embodiments, determining whether the requesting device identifier corresponds to trusted device value comprises determining whether the requesting device identifier comprises the device identifier encrypted with the secret token, and the method further comprises: denying access to the web service if the requesting device identifier does not comprise the device identifier encrypted with the secret token.

In various embodiments, the method further comprises encrypting the device identifier with the secret token to generate an encrypted device identifier. In some embodiments, the determination is made by comparing the encrypted device identifier with the trusted device value.

In various embodiments, the trusted device value corresponding to the device identifier stored on the storage device comprises the encrypted device identifier.

In various embodiments, the secret token is associated with an expiry time and the method further comprises: upon receiving the setup message, determining if the expiry time has been exceeded; and denying access to the web service if the expiry time has been exceeded.

In some embodiments, access to the web service is denied if the expiry time is exceeded prior to receiving the at least one setup message.

In various embodiments, the identifier comprises mobile device metadata.

In various embodiments, the code can be, but is not limited to a Quick Response (QR) code or a barcode.

In another aspect, some embodiments described herein relate to a system for authenticating mobile communications devices, the system comprising: a first storage device; a second storage device; and a processor, the processor configured to: generate a code corresponding to a user, the code configured to be rendered on a rendering device to produce a rendered code, the rendered code being readable by a mobile communications device having a code reading device, the rendered code comprising a secret token; store the secret token along with information identifying the user on a first storage device associated with an authentication server; transmit the code to a computing device; receive at least one setup message from a mobile communications device, the at least one setup message comprising a device identifier and the secret token; compare the received secret token and the secret token stored on the first storage device; and if the received secret token matches the secret token stored on the first storage device the, store, on the storage device, information identifying the user and a trusted device value corresponding to the device identifier.

In some embodiments, the first and second storage devices are the same storage device. In various embodiments, the first and second storage devices can be directly or indirectly coupled to the server.

In some embodiments, the setup message also comprises a user name. In some embodiments, the setup message also comprises a user password. In various embodiments, the user name and password are the user name and password used by the user to access the web service. For example, the username and password can be the user name and password used by the user to access the web service on a personal computer. In some embodiments, the processor is further configured to verify the user name or the password or both prior to storing the traduced device value.

In some embodiments, the rendering device can be, for example, but is not limited to, a display device or a printing device.

In some embodiments, the code comprises an identifier of a server for sending the setup message.

In some embodiments, the processor is further configured to: receive information pertaining to a request by a requesting mobile communications device for access to a web service, the information comprising a requesting device identifier; determine whether the requesting device identifier corresponds to the trusted device value stored on the storage device; and deny access to the web service if the requesting device identifier does not correspond to the trusted device value.

In some embodiments, the processor is further configured to: deny access to the web service if the requesting device identifier does not comprise the device identifier.

In various embodiments, the processor is further configured to: transmit the result of the determination step to a web server hosting the web service.

In some embodiments, the web service is accessible to the user through a user ID and a password; and wherein the web service is further accessible to the mobile device through the requesting device identifier. In other words, in some embodiments, the device identifier is used in place of or instead of the user name and password to gain access to the web service through the mobile device.

In various embodiments, the requesting device identifier corresponds to trusted device value comprises determining whether the requesting device identifier comprises the device identifier encrypted with the secret token.

In some embodiments, the trusted device value corresponding to the device identifier stored on the storage device comprises the encrypted device identifier.

In various embodiments, the secret token is associated with an expiry time; and the processor is further configured to: upon receiving the setup message, determine if the expiry time has been exceeded; and deny access to the web service if the expiry time has been exceeded.

In some embodiments, access to the web service is denied if the expiry time is exceeded prior to receiving the at least one setup message.

In various embodiments, the identifier comprises mobile device metadata.

In various embodiments, the code can be, but is not limited to a Quick Response (QR) code or a barcode.

In another aspect, embodiments described herein relate to a non-transitory machine-readable memory storing statements and instructions for execution by a processor for implementing a method of authenticating mobile communications devices. The method comprises: generating a code corresponding to a user, the code configured to be rendered on a rendering device to produce a rendered code, the rendered code being readable by a mobile communications device having a code reading device, the rendered code comprising a secret token; storing the secret token along with information identifying the user on a first storage device associated with an authentication server; providing the code to the user; receiving, at the authentication server, at least one setup message from the mobile communications device, the at least one setup message comprising a device identifier and the secret token; comparing the received secret token and the secret token stored on the first storage device; and if the received secret token matches the secret token stored on the first storage device, storing, on a second storage device associated with the server, information identifying the user and a trusted device value corresponding to the device identifier.

Other aspects and features of the present disclosure will become apparent to those of ordinarily skill in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for authorizing a mobile communication device as a trusted device for access to a secure web service using a readable code. The term "web service" as used herein can refer to, for example, but is not limited to, any suitable web service, website, web application or web portal. As used herein the term "secure web service" is used to denote a web service that limits access to authorized users through, for example, but not limited to, the use of usernames, passwords, tokens or a combination thereof.

In various embodiments, the user is provided with a readable code for authorizing the device and, in some embodiments, the code is generated in response to a request from the user, which may be submitted to an authentication system. The code is read by, for example, using a code reading device that may be included or coupled to the mobile communications device that they wish to authorize as a trusted device. In various embodiments disclosed herein, the code includes instructions that are to be executed by the mobile device in order to become a trusted device. Accordingly, after the code is read by mobile communications device, the mobile communications device executes various functions based on information provided by the code in order to become a trusted device.

Figure 1:
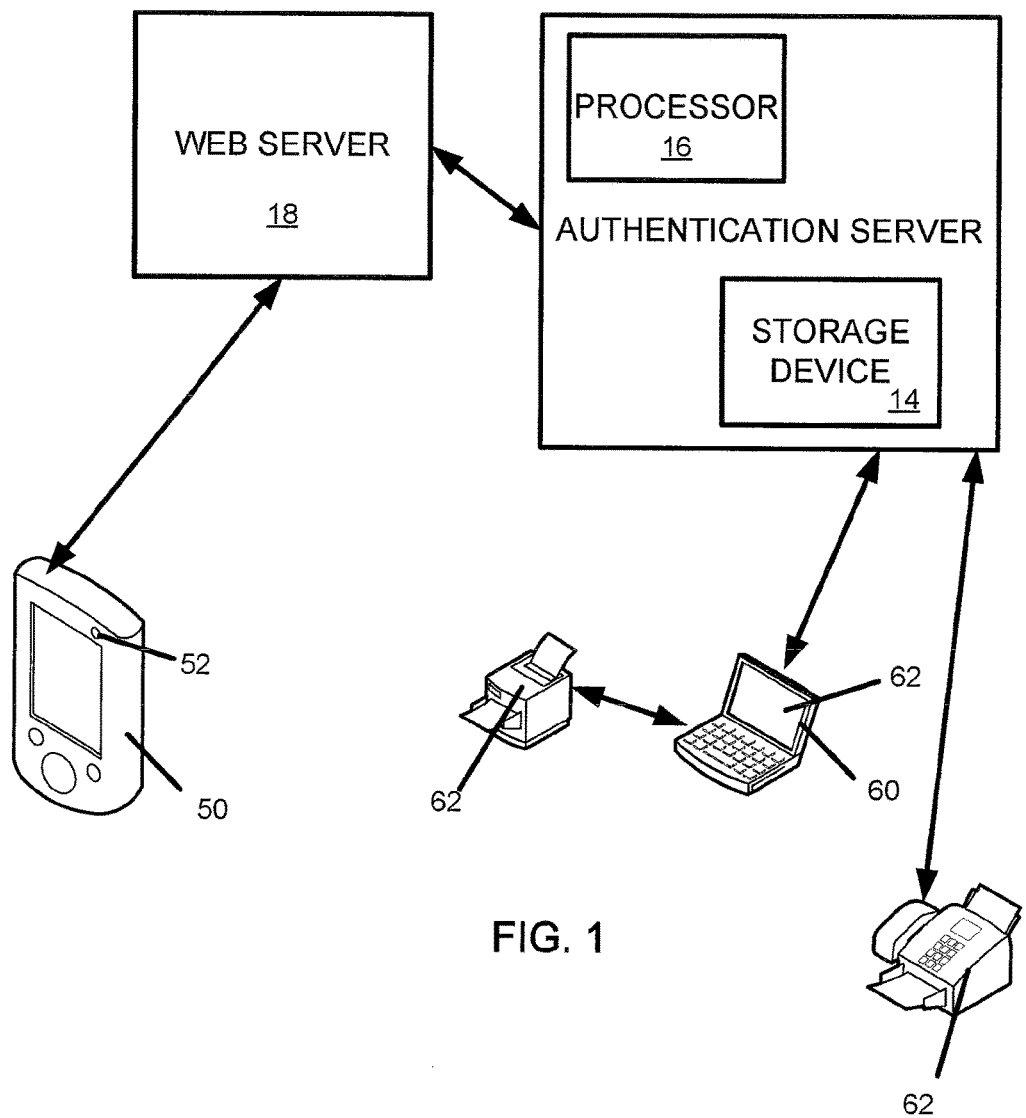
FIG. 1 is a block diagram of an authentication system according to various embodiments.

Reference is first made to FIG. 1, which illustrates a block diagram of authentication system 10, according to various embodiments. Authentication system 10 comprises an authentication server 12. Authentication server 12 comprises a storage device 14, and a processor 16. Storage device 14 can be any appropriate storage device such as, for example, but not limited to, a solid-state device, a magnetic storage device, and optical storage device or combinations thereof, including, but not limited to, a hard disk drive and a flash drive. In some embodiments, authentication server 12 comprises an internet server.

Authentication server 12, in various embodiments, is used to, for example, authenticate a mobile communication device 50 for access to a web service hosted by Web server 18. Web server 18 can be any appropriate Web server that hosts a website or a web service. In various embodiments, web server 18 requires authentication for access to the web service or website hosted by it. In some embodiments, authentication server 12 is coupled to Web server 18 through any appropriate communication link, such as, for example, one or more networks, such as, for example, the Internet. In other embodiments, web server 18 and authentication server 12 are separate. In some embodiments, authentication server 12 comprises web server 18. In some embodiments, web server 18 comprises an internet server.

In various embodiments, mobile communication device 50 can be any suitable mobile communication device, such as, for example, but not limited to, a smart phone or a tablet computer. In various embodiments, mobile communication device 50 comprises a code reading device 52. In some embodiments, code reading device 52 is a digital camera. In some embodiments, mobile communication device 50 includes a program to interpret a code read by code reading device 52.

Authentication server 12 is coupled to a computing device 60 through any appropriate communication link, such as for example, one or more networks, such as for example, but not limited to, the Internet, a cellular network, and a combination thereof. Computing device 60 can be any appropriate computing device, such as, for example, but not limited to, an internet server, a personal computer, a laptop computer, and a tablet computer. In various embodiments, computing device 60 comprises or is coupled, possibly through one or more networks, to a rendering device 62 such as, for example, but not limited to, a display device or a printing device. The display device can be any appropriate display device, including, but not limited to, a liquid crystal display (LCD), cathode ray tube (CRT) display, and a television. The printing device can be for example, but is not limited to, an inkjet printer, a laser printer, a photocopier, or a fax machine. In some embodiments, authentication server 12 may communicate with a standalone rendering device such as, but not limited to, a fax machine without an intervening computing device 60.

Figure 2:
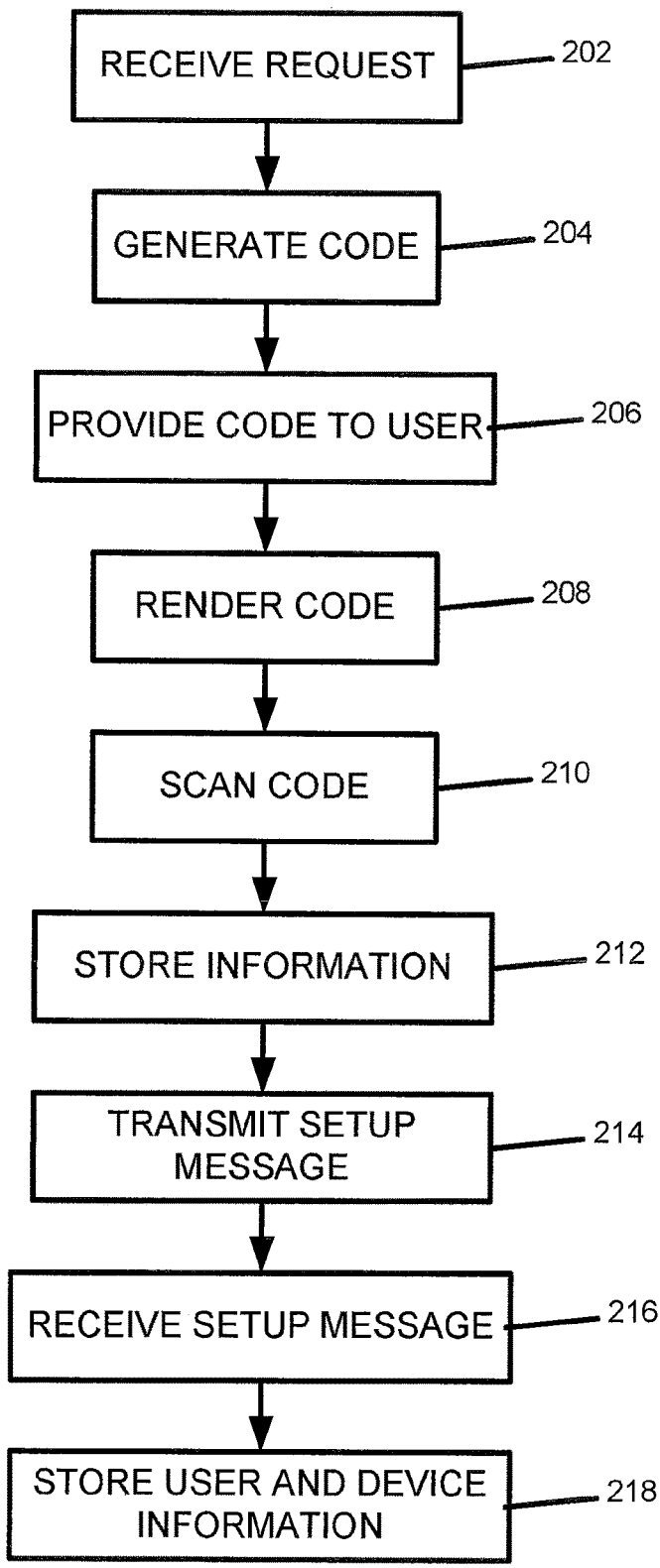
FIG. 2 is a flowchart diagram of a method of authorizing a mobile communication device, according to various embodiments.

Reference is now made to FIG. 2, which is a flowchart diagram illustrating a method of authorizing a mobile communication device, according to various embodiments.

At 202, authentication server 12 receives the request for authorizing a mobile communication device to become a trusted device for access to a web service. This request may be generated in any suitable manner. For example, in some embodiments, the user of the mobile communication device logs into a secure website (e.g. using a computing device 60) where the request is generated.

At 204, authentication server 12 generates a code. In various embodiments, authentication server 12 generates computer readable instructions that can be used to instruct a computing device, such as computing device 60, to render the code in a format that is readable by code reading device 52. In various embodiments, the code includes a secret token, which may be for example a globally unique identifier (GUID), such as for example but not limited to a unique string of characters (including, but not limited to, letters or numbers or both). In some embodiments, the code also includes one or more Uniform Resource Locators (URLs). In some embodiments, the URL is used to designate an address from which mobile communications device 50 can obtain instructions and/or information for use in the method. In some embodiments, the URL designates an address of a device (e.g. authentication server 12) to which mobile communication device 50 can send a set up message. In some embodiments, the code is also associated with an expiry time. In some embodiments, the expiry time is included in the code. In some embodiments, the expiry time is recorded together with the secret token associated with the code at a storage device associated with authentication server 12, when the code is generated such as for example storage device 14. In some embodiments, this is achieved by 1) logging an expiry time on the server, including a timestamp of generation in the code; and 2) logging a timestamp of generation on the server-side, and having a server-side setting for expiry (so at the time of a web service call, the server compares the generation time to the current time including the "setting" for expiry length to establish if the code is still valid).

At 206, the code is provided to the user. In some embodiments, this is accomplished by transmitting computer readable instructions for rendering the code from authentication server 12 to computing device 60. In other embodiments, authentication server 12 may directly or indirectly communicate with a rendering device 62, such as, for example, but not limited to, a fax machine.

At 208, the code is rendered. In some embodiments, this is accomplished by computing device 60 rendering the code using rendering device 62 to produce a rendered code that is readable by code reading device 52. For example, in some embodiments, rendering can include displaying the code on the display of computing device 60. In other embodiments, rendering can include printing the code on paper using a printer, that may, for example, be coupled to computing device 60 either directly or through one or more networks. In various embodiments, the rendered code can appear in any readable format including, but not limited to, as a QR code or a bar code.

At 210, the rendered code is read by code reading device 52. In various embodiments, code reading device 52 comprises the camera of mobile device 50. Accordingly, in some embodiments, the user of mobile device 50, the user reads the code by using the code reading device to "visualize" the rendered code. As used herein, the term "visualize" can mean that the camera captures an image for the purposes of processing the code. However, this does not require that a picture be taken in the traditional sense as when an image is persistently stored on a disk. As mentioned above, in various embodiments, mobile device 50 includes logic (e.g. software and/or hardware) to interpret the code.

At 212, based on the read code, communications device 50 stores the secret token that is included in the code on the local storage device of mobile communications device 50. In some embodiments, the code includes a URL of an address from which mobile communications device 50 can obtain instructions and/or information. In some embodiments, the secret token is provided by the device identified by the URL. Accordingly, in some embodiments, if an item is said to be "included in the code" that can mean that the item is not actually present in the code but a way of obtaining the item is provided in the code. In other embodiments, the secret token is actually included in the code.

At 214, mobile communications device 50 transmits a setup message based on the read code. In some embodiments, the code includes instructions and/or information for how and where to send the code. In other embodiments, the software on mobile communications device 50 is hard-coded to use a specific web server, or URL, or location to send the secret code. Accordingly, in some embodiments, this technology can be used as a component of software and can be locked to a specific authentication server or service. In some embodiments, the setup message is transmitted to web server 18. In other embodiments, the set up message is transmitted to authentication server 12. In some embodiments, the set up message includes a unique identifier (UID) of mobile communication device 50. In various embodiments, the unique identifier is a globally unique identifier of the device and can include, for example, but is not limited to, an identifier generated based on device metadata or a unique identifier associated with the device including but not limited to any universally unique identifier (UUID), an International Mobile Equipment Identity (IMEI), or a Media Access Control (MAC) address. In some embodiments, the set up message also includes the secret token. In some embodiments where the code includes an expiry time, if the expiry time has lapsed, then mobile communication device 50 does not generate a set up message and the method ends such that mobile communications device does not become a trusted device for the web service unless further action is taken such as repeating the method with a valid code. In other embodiments, as described in greater detail below, the server 12 determines if the code has expired and if so, rejects it. In some such embodiments, the code may not have any expiry data or timestamp with it, and is simply tied to a secret code on the server side (which can be produced at the time the code was generated). In various embodiments, the setup message is encrypted.

At 216, the set up message is received by either authentication server 12 or web server 18. The setup message is used to link the unique identifier with the username and password used by the user to access the web service hosted by web server 18. In some embodiments where the setup message is received by web server 18, web server 18 forwards the setup message or a portion thereof to authentication server 12. As will be understood by those skilled in the art, the set up message itself or the payload of the set up message (e.g. the secret token and the UID) can be encrypted in any suitable manner. In some embodiments, the set up message also includes information identifying the user (e.g. username and/or password). In other embodiments, the set up message does not include separate user identifying information, such as the username. In some such embodiments, the token is generated for and is uniquely associated with a specific user. This association is recorded server side at the time of generation (as described below in relation to 218) and therefore upon receipt of the token the server is able to identify the specific user. In some embodiments, for greater security, the username and password are transmitted (e.g. the user to enter this information before the setup message is transmitted) despite the unique association between a secret token and user. This may be done, for example, to prevent a different individual from making use of the code to gain access to the user's account.

At 218, the UID and secret token are stored on storage device 14 along with information identifying the user such that the UID is tied to the user's account for the web service. In some embodiments, the unique identifier and secret token are stored on a storage device 14.

Once mobile communication device 50 has been authorized, it can be referred to as a trusted device.

In some embodiments where an expiry date is used, at some point prior to authorizing a device and storing the information at 218, authentication server 12 determines whether the expiry time associated with the code has lapsed. In some embodiments, when the code is generated, authentication server 12 stores the token along with the expiry time. When a setup message including the token is received, the associated expiry time is checked to ensure it has not lapsed. In some embodiments, if the expiry time has lapsed, authentication server 12 does not store the information and the mobile communications device 50 does not become a trusted device for the web service unless further action is taken such as repeating the method with a valid code.

Figure 3:
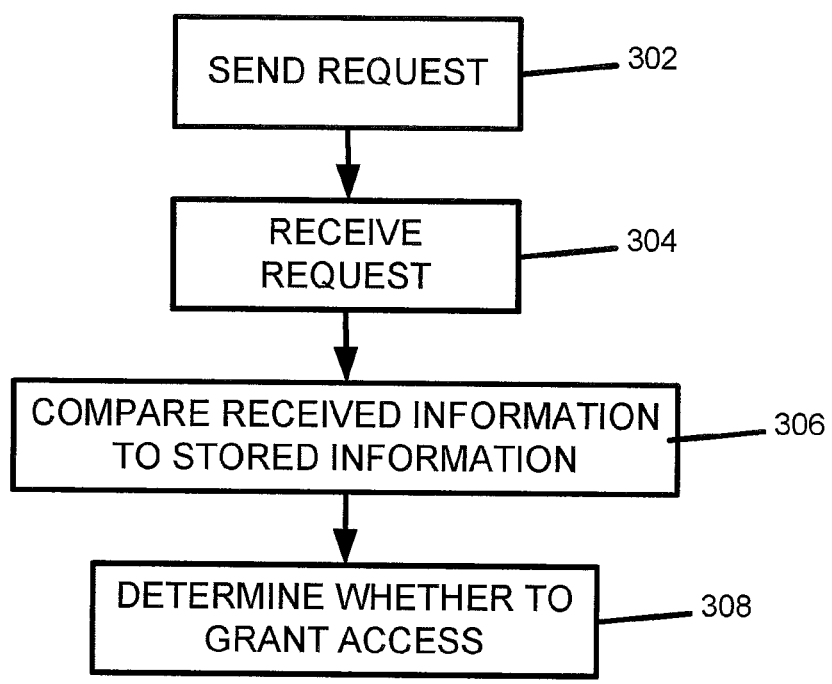
FIG. 3 is a flowchart diagram of a method of authenticating a trusted device, according to various embodiments.

Reference is now made to FIG. 3, which illustrates a flowchart diagram of a method of authenticating a trusted device, according to various embodiments.

At 302, mobile communications device 50 sends a request for access to the web service hosted by Web server 18. In some embodiments, as part of the request, mobile communications device 50 transmits any suitable information for the purpose of authenticating the device. In some embodiments, mobile communications device 50 sends the unique identifier along with an encrypted unique identifier. In some embodiments, the encrypted unique identifier is encrypted using the secret token as an encryption key. In some embodiments, the message is encrypted by mobile communications device 50 prior to transmitting the message. In other words, in some embodiments the unique identifier and the encrypted unique identifier are further encrypted and transmitted as part of the request for access.

At 304, the request is received by web server 18. In some embodiments, web server 18 transmits a portion of the request to authentication server 12 for authentication based on the stored information on storage device 14.

At 306, authentication server 12 compares the information received from mobile communications device 50 with the information stored on storage device 14 for that user.

As mentioned above, in some embodiments, storage device 14 stores the encrypted unique identifier, which is encrypted using the secret token as an encryption key. In some such embodiments, the encrypted unique identifier is not decrypted. Instead, encryption is used and thereby greater security can be provided. In some such embodiments, the encrypted unique identifier provided by mobile device 50 is compared to the encrypted unique identifier stored on storage device 14.

In other embodiments, the secret token is stored on storage device 14 and the authentication server decrypts the encrypted unique identifier and compares it to the unique identifier stored for the user of mobile communications device 50.

At 308, based on the results of the comparison, it is determined whether or not to grant access to the requesting mobile communications device 50. In some embodiments, the determination is made by authentication server 12. In other embodiments, the results of the comparison are transmitted to web server 18, which then determines whether or not to grant access.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Some embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage device including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method, comprising:
   storing a credential associated with a user on a first storage device associated with an authentication server;
   generating, at the authentication server, a code corresponding to a user and comprising the credential;
   sending, by the authentication server, the code to a first electronic device; and
   receiving, at the authentication server, at least one authentication message from a second electronic device, wherein the second electronic device was provided the code by the first electronic device, and wherein the at least one authentication message comprises the credential and authentication information, wherein the second electronic device obtained the credential from the code.

2. The method of claim 1, wherein the authentication information comprises information identifying the user associated with the credential.

3. The method of claim 2, wherein the authentication information further comprises a password associated with the user.

4. The method of claim 1, further comprising:
   authenticating, by the authentication server, the user based on one or more of the credential and the authentication information included in the at least one authentication message.

5. The method of claim 4, wherein the authentication information comprises one or more of information identifying the user associated with the credential, and a password associated with the user, and
   wherein the authenticating of the user comprises:
      authenticating, by the authentication server, the user using one or more of the credential, the information identifying the user associated with the credential, and the password associated with the user.

6. The method of claim 4, wherein the authenticating of the user further comprises:
   determining, by the authentication server, whether the credential and the authentication information included in the at least one authentication message matches the information identifying the user and the credential associated with information identifying the user that is stored on the first storage device associated with the authentication server.

7. The method of claim 6, in response to determining that the credential and the authentication information included in the at least one authentication message matches the information identifying the user and the credential associated with information identifying the user that is stored on the first storage device associated with the authentication server, storing, on a second storage device associated with the authentication server, information identifying the user and a trusted electronic device value corresponding to an electronic device identifier that is transmitted in the at least one authentication message.

8. The method of claim 7, further comprising:
   receiving, at the authentication server, information pertaining to a request by a requesting electronic device for access to a web service, the information comprising a requesting electronic device identifier;
   determining whether the requesting electronic device identifier corresponds to the trusted electronic device value stored on the second storage device; and
   denying access to the web service if the requesting electronic device identifier does not correspond to the trusted electronic device value.

9. The method of claim 1, wherein the code comprises an identifier of a server for sending the at least one authentication message.

10. The method of claim 1, wherein providing the code to the second electronic device by the first electronic device comprises one or more of:
    displaying the code on a display unit; and
    reproducing the code on a readable medium.

11. The method of claim 1, wherein the code is a Quick Response (QR) code.

12. A system, comprising:
    an authentication server;
    a first storage device associated with the authentication server; and
    a second storage device associated with the authentication server, the authentication server comprising at least one processor, the at least one processor configured to:
       store a credential associated with a user on the first storage device associated with the authentication server;
       generate a code corresponding to a user and comprising the credential;
       sending the code to a first electronic device; and
       receive at least one authentication message from the a second electronic device, the at least one authentication message comprising the credential and authentication information, wherein the second electronic device received the code from the first electronic device and obtained the credential from the code.

13. The system of claim 12, wherein the authentication information comprises information identifying the user associated with the credential.

14. The system of claim 13, wherein the authentication information further comprises a password associated with the user.

15. The system of claim 12, wherein the at least one processor is further configured to:
   authenticate the user based on one or more of the credential and the authentication information included in the at least one authentication message.

16. The system of claim 15, wherein the authentication information comprises one or more of information identifying the user associated with the credential, and a password associated with the user, and
   wherein the at least one processor is further configured to authenticate the user using one or more of the credential, the information identifying the user associated with the credential, and the password associated with the user.

17. The system of claim 15, wherein the at least one processor is further configured to determine whether the credential and the authentication information included in the at least one authentication message matches the information identifying the user and the credential associated with information identifying the user that is stored on the first storage device associated with the authentication server.

18. The system of claim 17, wherein the at least one processor is further configured to, in response to determining that the credential and the authentication information included in the at least one authentication message matches the information identifying the user and the credential associated with information identifying the user that is stored on the first storage device associated with the authentication server, store, on the second storage device associated with the authentication server, information identifying the user and a trusted electronic device value corresponding to an electronic device identifier that is transmitted in the at least one authentication message.

19. The system of claim 18, wherein the at least one processor is further configured to:
   receive information pertaining to a request by a requesting electronic device for access to a web service, the information comprising a requesting electronic device identifier,
   determine whether the requesting electronic device identifier corresponds to the trusted electronic device value stored on the second storage device, and
   deny access to the web service if the requesting electronic device identifier does not correspond to the trusted electronic device value.

20. The system of claim 12, wherein the code comprises an identifier of a server for sending the at least one authentication message.

* * * * *